United States Patent
Finn et al.

(10) Patent No.: US 6,588,912 B1
(45) Date of Patent: *Jul. 8, 2003

(54) FOLDABLE MODULAR LIGHT DIFFUSION BOX

(75) Inventors: Bruce L. Finn, Santa Monica, CA (US); Robert E. Lee, Topanga, CA (US)

(73) Assignee: Bruce Finn, Malibu, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 09/642,315

(22) Filed: Aug. 21, 2000

Related U.S. Application Data

(62) Division of application No. 09/146,063, filed on Sep. 2, 1998, now Pat. No. 6,106,125.

(51) Int. Cl.⁷ .............................................. G03B 15/06
(52) U.S. Cl. ............................ 362/11; 362/17; 362/368
(58) Field of Search ............................. 362/11, 17, 368

(56) References Cited

U.S. PATENT DOCUMENTS

| | | | | |
|---|---|---|---|---|
| 3,311,745 A | * | 3/1967 | Gossner | 362/227 |
| 3,509,334 A | | 4/1970 | Michailov | 240/81 |
| 4,295,187 A | | 10/1981 | Shemitz | 362/352 |
| 4,409,646 A | | 10/1983 | Baliozian | 362/319 |
| 4,428,030 A | | 1/1984 | Baliozian | 362/18 |
| D272,656 S | | 2/1984 | Parker | D26/65 |
| 4,446,506 A | | 5/1984 | Larson | 362/17 |
| 4,490,776 A | * | 12/1984 | Kluch | 362/16 |
| 4,504,888 A | | 3/1985 | Rosenthal | 362/18 |
| 4,616,293 A | | 10/1986 | Baliozian | 362/7 |
| 4,707,766 A | * | 11/1987 | Bertozzi et al. | 362/11 |
| 4,719,545 A | | 1/1988 | Cano | 362/240 |
| 4,757,425 A | | 7/1988 | Waltz | 362/18 |
| 4,788,628 A | | 11/1988 | Farrall | 362/18 |
| 4,855,874 A | | 8/1989 | Waltz | 362/16 |
| 4,998,189 A | | 3/1991 | Guggemos | 362/278 |
| 5,128,838 A | | 7/1992 | Brandess | 362/18 |
| 5,311,409 A | | 5/1994 | King | 362/17 |
| 5,651,602 A | | 7/1997 | Tawil et al. | 362/18 |
| 6,106,125 A | | 8/2000 | Finn et al. | 362/11 |

FOREIGN PATENT DOCUMENTS

GB 2223565 A 4/1990

OTHER PUBLICATIONS 6,000 Watt Molequartz® Six–Light Molepar®, Type 5761, Product Flyer, Hollywood, CA, Jun., 1996.

(List continued on next page.)

*Primary Examiner*—Sandra O'Shea
*Assistant Examiner*—Ismael Negron
(74) *Attorney, Agent, or Firm*—Cislo & Thomas, LLP; Daniel M. Cislo, Esq.

(57) ABSTRACT

A lighting box or front projection light device has a housing with an open front and open rear and a bar or rod extending horizontally across the housing. Multiple stage-type nonfocusable lights such as par lamps are mounted on the bar and positioned to send light out the front of the box. The box also has a diffusion element holder (frame) disposed proximate its front end, and even may have multiple diffusion element holders including having one diffusion element holder at an angle. Each diffusion element holder has a diffusion element or filter. The diffusion element or elements receive the light from the lighting instruments and diffuse it to provide a soft projected light from the box. In accordance with one aspect of the invention, this light may be used to provide diffused light as part of the key lighting for a stage or set, and may provide such soft projected lighting from a front (downstage) of the stage or set.

20 Claims, 5 Drawing Sheets

OTHER PUBLICATIONS 6,000 Watt Six–Light Overhead Cluster (COOP), Type 20133, Product Flyer, Hollywood, CA, Sep., 1996.

2,000 Watt Molequartz Spacelight, Type 7271, Mole–Richardson Lighting Catalog, Hollywood, CA, Jun. 27, 2002.

Lights Up Industries Website excerpts, Los Angeles, CA, Jul. 12, 2002.

*The Fisher Light®*, Website Excerpts, Fisherlight, North Hollywood, CA, Aug. 16, 2002.

Kinoflo Website Excerpts, Jul. 15, 2002.

Broncolor Website Excerpts, Jul. 12, 2002.

"Dino–Light, Multi–Light, Mini–Brute" from Licht–Technik Vertriebs GmbH of Munich, Germany, Website Excerpts, Jul. 12, 2002.

Plume Website Materials, Jul. 12, 2002.

Photoflex Website Materials, Jul. 12, 2002.

*Chimera News*, vol. 18, No. 1, Chimera Photographic Lighting, 6–page newsletter, Boulder, Colorado, Jun. 1998.

*Chimera Product Catalog*, Chimera, Boulder, Colorado, May 1997.

* cited by examiner

FOLDABLE MODULAR LIGHT DIFFUSION BOX

CROSS-REFERENCE TO RELATED APPLICATIONS

This application is a continuation of application Ser. No. 09/146,063 filed Sep. 2, 1998, now and issuing as U.S. Pat. No. 6,106,125 on Aug. 22, 2000.

BACKGROUND OF THE INVENTION

The present invention relates to a portable modular light diffusion box, and in particular such a box which includes light diffusion frame(s) and the capacity to contain multiple lights. In the entertainment industry including motion pictures, television and theatrical arts, as well as in the photographic industry and other fields, it is necessary to light a set, stage or other area. Often, particularly for an indoor set in the motion picture and television industries, the key (primary) lighting is provided at the back corners of the set (opposite where the camera and audience, if any, will be) to avoid boom (sound equipment) shadows and a fill light from the front in accordance with a theory known as back cross key lighting.

Although back cross key lighting is used almost exclusively for sitcoms, there are some inherent drawbacks to the system. One problem is that the "key" or strongest light comes from the top/back (upstage) portion of the set, so there are invariably shadows thrown from the people and objects on the set onto each other. Also, in many cases there are shadows from a person's facial features that fall upon that person's face, such as nose shadows. The strong ("hard") light coming from the back also creates hot rims around people and is especially objectionable on bald or light-haired individuals. This hard light, which is traditionally used, can also create unwanted microphone boom shadows.

In studio photography, light diffusion gel frames have been used to soften lighting by diffusing the light. These frames have been typically individually mounted in front of or to a lighting instrument.

Conventional wisdom is that the lights are mounted on a stand, on a pipe, or on typical set scaffolding known as a green bed. As there are numerous lights on a set, and as providing a diffusion screen on each light is cumbersome, and as it is further cumbersome to change such screens and to align such lights to properly cooperate, the use of individually mounted diffusion devices is not practical or economical for some set lighting, especially sitcoms.

Examples of individually mounted diffusion gel supporting members are shown in U.S. Pat. No. 5,651,602 to Joseph N. Tawil, issued Jul. 29, 1997, and U.S. Pat. No. 4,446,506 to Raymond G. Larson issued May 1, 1984. These require special brackets or rings to mount to the lighting instrument, and are often dependent on the type of light.

A diffusion device has been known to be used with multiple lights, such as in U.S. Pat. No. 4,855,874 to Thomas A. Waltz issued Aug. 8, 1989. The Waltz patent discloses a light modifier which is inflatable and surrounds multiple lights attached to a stand or to other support rods which are not part of the inflatable device. The device itself which provides light diffusion must be entirely changed to change the light diffusion effect, and it has limited ability to control and direct light. It is therefore impractical to use for set lighting.

U.S. Pat. No. 5,128,838 to Muriel H. Brandess issued Jul. 7, 1992, discloses a photographic filter-holding apparatus that has a mechanism for holding a filter in front of a light. In one embodiment there are two lights, but each light has a separate filter, and it also requires a special mounting structure.

What is needed is a box which can diffuse and control light from multiple lights in such a way that the box and lights are stable, preferably avoid the need for expensive lighting instruments such as fresnel (focusable) lights, and provide soft, diffused light preferably from multiple instruments such as par cans ("pars"), to enable the use of front projected lighting as the key or primary lighting for a stage or set.

What is also needed is a device that can project soft key light in a controllable way deep into the set evenly from front to back and side to side while having a compact profile to allow for cameras underneath and viewers behind. The light would be parallel to and under the microphone booms thus eliminating boom shadows. The light would also come from a similar angle as the cameras eliminating or "burying" shadows behind the objects themselves.

SUMMARY OF THE INVENTION

In one embodiment, the invention provides a modular light diffusion box which preferably is adapted to be in front or to hold multiple lights. The box has a housing for channeling and controlling the light, the housing having two sides, a top and a bottom formed so as to be lightweight yet rigid or substantially rigid. The housing also has a channel or channels for supporting a diffusion frame or frames, or filters. In a preferred embodiment, the housing supports a bar, such as speed rail™ or other cross-member on which multiple lights may be mounted, and in another preferred embodiment, the box is foldable and portable.

It is also preferable that the box have an angle at its front end for directing light towards a set or stage when the box is elevated with respect thereto.

DETAILED DESCRIPTION OF THE PREFERRED EMBODIMENT(S)

Figure 2:
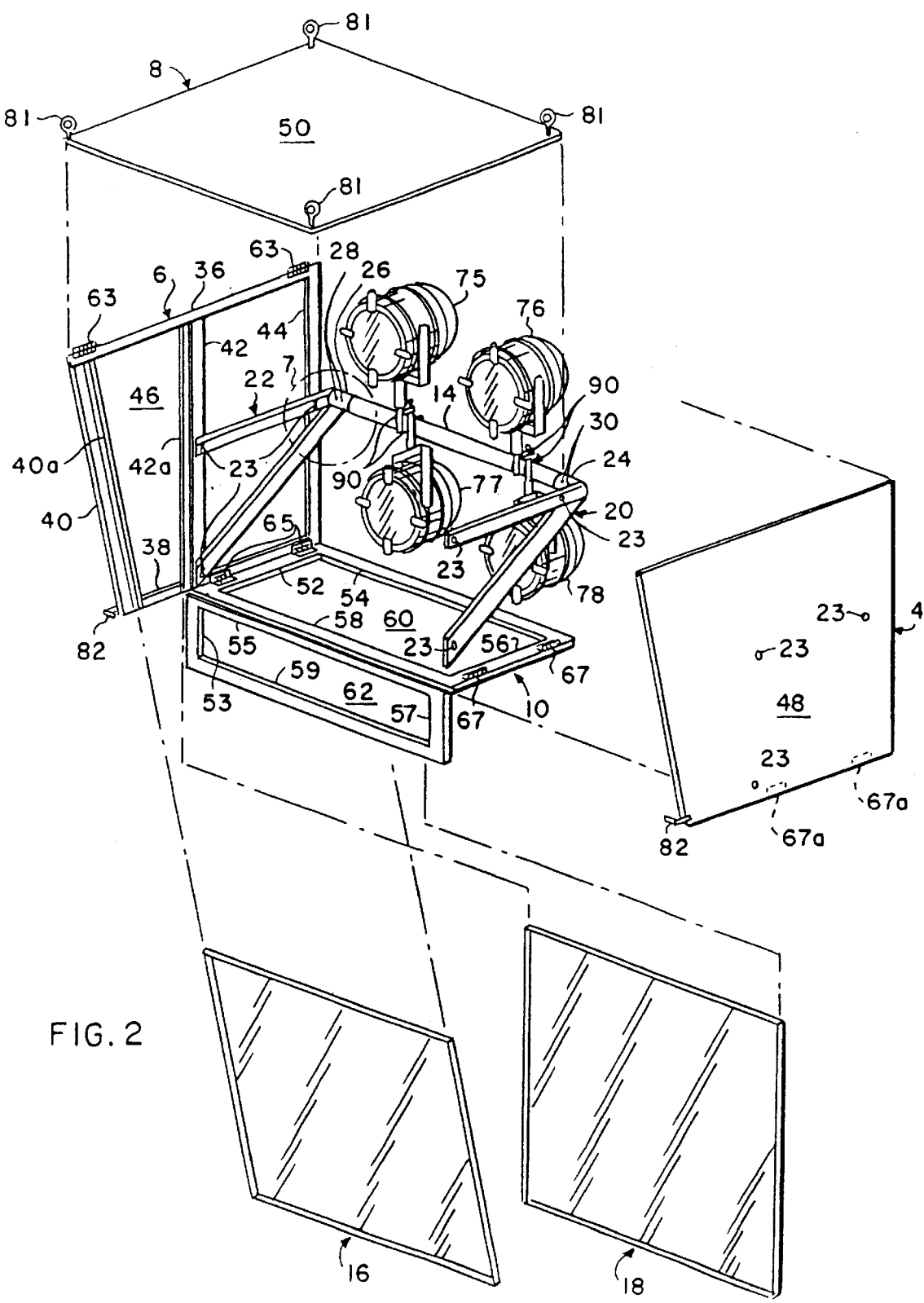
FIG. 2 is an exploded perspective view of a light box according to the invention.

In FIG. 2, a box 1 according to one embodiment of the invention is shown. It has a housing with four sides, namely a left side 4, a right side 6, a top 8 and a bottom 10, which are shown planar. The back is preferably open and the box preferably has a light mounting structure such as a crossmember, holder or bar 14. Bar 14 is preferably formed by speed rail, a standard rod well known in the motion picture and television industry for mounting lights such as pars. The bar 14 may be any kind of cross-member or other structure suitable to readily mount multiple lights. At the front of the housing there are two diffusion holding elements, filter holding elements, screens or frames 16, 18, which each hold diffusion elements or filters. In use only one diffusion screen or filter need be used. Part of the screen or screens may be made opaque for further control of the light emanating from the box. The phrase diffusion element will be used herein to mean diffusion frame, screen or other structure used to diffuse or soften light from the stage lights.

The bar 14 is mounted to the left and right sides of the housing by means of members or V-brackets 20, 22, having cups 24, 26, respectively, which each receive the ends of the bar. Set screws 28 and 30 are used to fix the ends of the bar in the cups.

In the disclosed embodiment, each side, top or bottom of the housing consists of a skeletal frame with frame members and a panel, preferably opaque, and the sides are hinged together. With continued reference to FIGS. 2, 3 and 4, side 6 has frame members 36, 38, 40, 42 and 44 and an opaque (right side) panel 46 to which the frame members are bolted, riveted, soldered or otherwise connected. The left side 4 is constructed using a mirror image of frame members to which a panel 48 (an opaque, left side panel) is fastened in like manner. On the right side panel 46, and in like mirror image on the left side panel 48, there are two channel members 40a, 42a for receiving the diffusion elements 16, 18. The diffusion elements are constructed preferably in a manner similar to screen windows. If only one diffusion element is used, it is preferable to use the forwardmost element 16. The top 8 also has a panel 50 and frame members around the edges, including frame members 47, 49, 51. The bottom 10 has two panels 60, 62, the larger panel having frame members 52, 54, 56 and 58 around its edges and the smaller panel 62 having frame members 53, 55, 57 and 59 around its edges. The smaller panel and its frame members form a door 10a.

The various frame members may be rectangular tubing, and the frame members, panels and other components are preferably of a lightweight but strong material such as aluminum, and the channel members may by C-shaped and preferably constructed of a lightweight rigid material such as aluminum as well. The sides, top and bottom may be formed of any rigid or semi-rigid material sufficient to support the cross-member 14 and a mechanism for mounting the cross-member 14.

Figure 3:
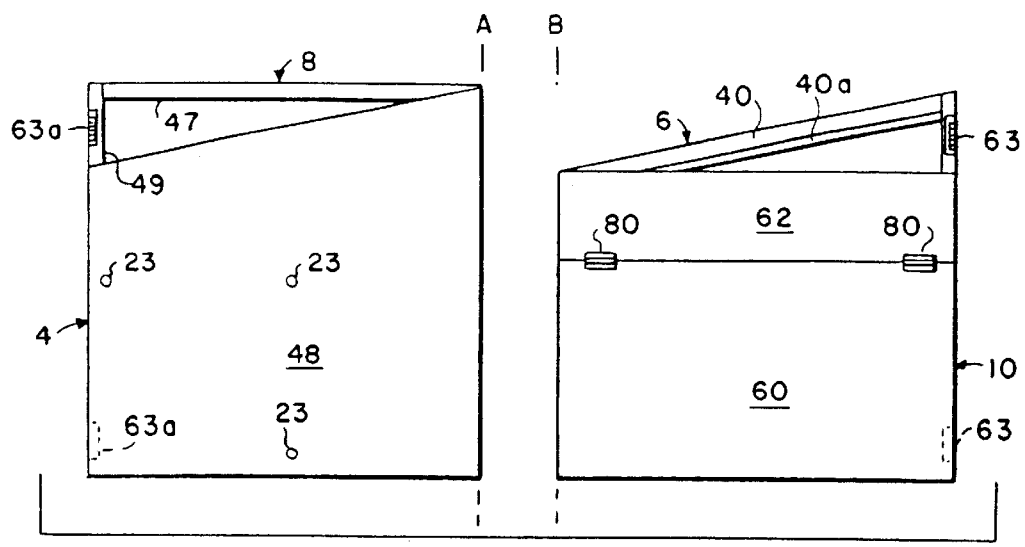
FIG. 3 is a side view (rotated 90° clockwise with respect to FIG. 2) showing a top and left-side subassembly and a bottom and right-side subassembly of the box of FIG. 2 in a folded position in accordance with an aspect of the invention.

So that the box is easy to transport and store, the sides, top and bottom are preferably formed so as to be foldable in two units, as shown in FIG. 3. The left side of FIG. 3 shows left side 4 and top 8 which are preferably permanently hinged together for rotation and folding about axis A. The right side of FIG. 3 shows bottom 10 and right side 6 which are permanently hinged together for folding about axis B. The permanent hinged connections are shown by hinges 65 in FIG. 2 which connect the bottom frame member 52 to the right side frame member 38, and like hinges (not shown) connect a frame member of the left side 4 and top 8. The two subassemblies, i.e., the top 8 and right side 6 and the bottom 10 and left side 4, connect together by means of two sets of knockout hinges. These include half hinge members 63 mounted to frame member 36 of the right side 6 which mate with half hinge members 63a (FIG. 3), which then receive a knockout (hinge) pin. Similar half hinges 67 and 67a are mounted on the bottom frame member 56 and a frame member (not shown) of left side 4. With this structure, the two subassemblies may be readily connected and disconnected by inserting or removing hinge pins.

Figure 4:
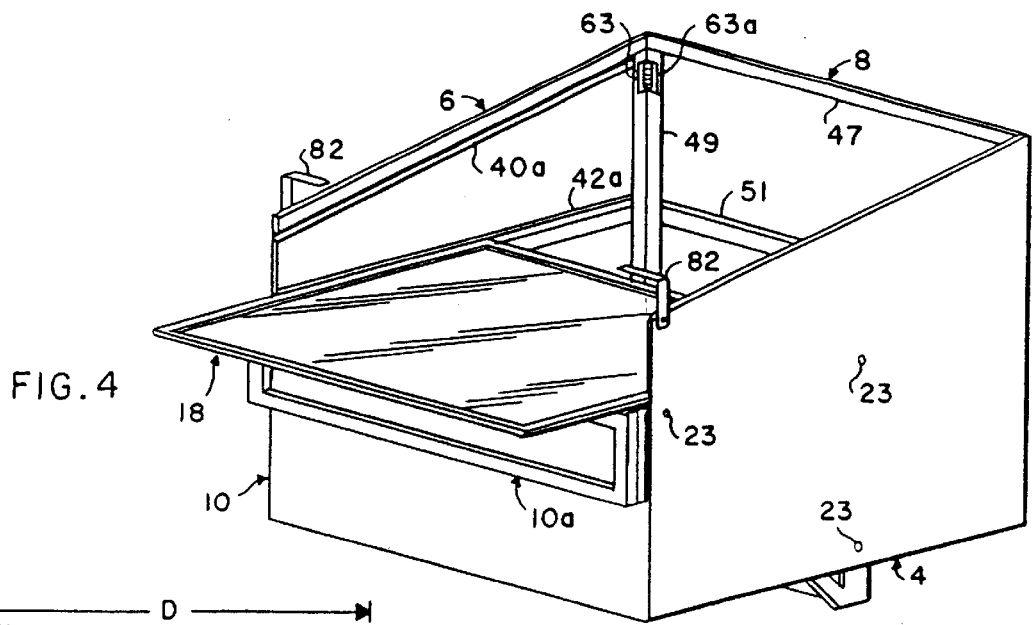
FIG. 4 is a perspective view (rotated 90° clockwise with respect to FIG. 2) showing a bottom of the box of FIG. 2 with a bottom door open and a diffusion screen being slid into the box in accordance with another aspect of the invention.

The door 10a of the bottom enables the diffusion elements 16, 18 to be readily removed and replaced when the box is assembled, even when it is in place for lighting a set or stage. Hinges 80 (FIG. 3) on the external side of bottom 10 connect panel 60 and panel 62, which is smaller than panel 60, and thus enable the door to rotate open and closed. As best shown in FIG. 4, two angle members 82 bolted at one end to the sides 4, 6, are rotatable between the positions shown in FIG. 1 to hold the door closed and the position shown in FIG. 4 to open the door.

In one embodiment of the invention, the housing and diffusion element(s) may be used without the V-brackets and bar, and may be mounted to scaffolding or otherwise positioned in front of multiple stage-type lights. In the preferred embodiment, multiple stage-type lights 75, 76, 77 and 78 may be readily clamped onto the bar 14 supported by the housing. Where the bar is a rod such as speed rail™ or the like, typical stage lights have C-clamps 90 readily connectable to such rod or speed rail™. Therefore, regardless of the stage-type light that is used, it may be quickly mounted and unmounted from the bar 14. Accordingly, no special mounting structure is necessary, although any suitable mounting structure will do.

Figure 7:
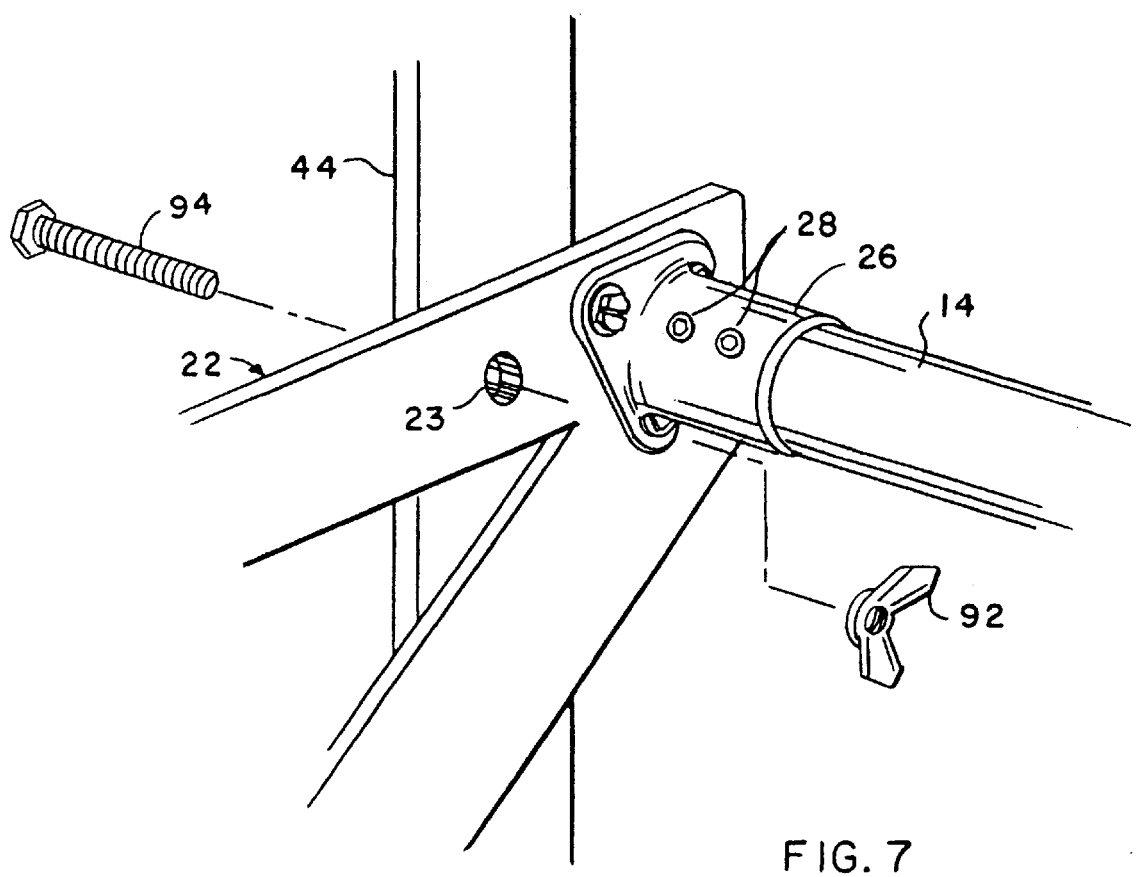
FIG. 7 is an enlarged view of a portion of FIG. 2 inside circle 7.

In operation, the box may be assembled as follows:

The two sub-assemblies of FIG. 3 may be rotated to be open at 90°. The hinge halves 63, 63a and 67, 67a are then positioned to mate, and the hinge pins are inserted. The housing may then be rotated onto its bottom panel and the V-brackets 20, 22 may be bolted to the frame members of the left and right side using wing nuts 92 and bolts 94 (shown in detail in FIG. 7), after inserting the speed rail in the cups 24, 26 and tightening the set screws 28, 30.

Alternatively, the V-brackets may be affixed to the side members before the side members, top and bottom subassemblies are connected. One side of the speed rail would then be inserted into one cup and the set screws tightened, and the other side would then be inserted into the remaining cup upon connecting the side, top, bottom and other side.

Figure 1:
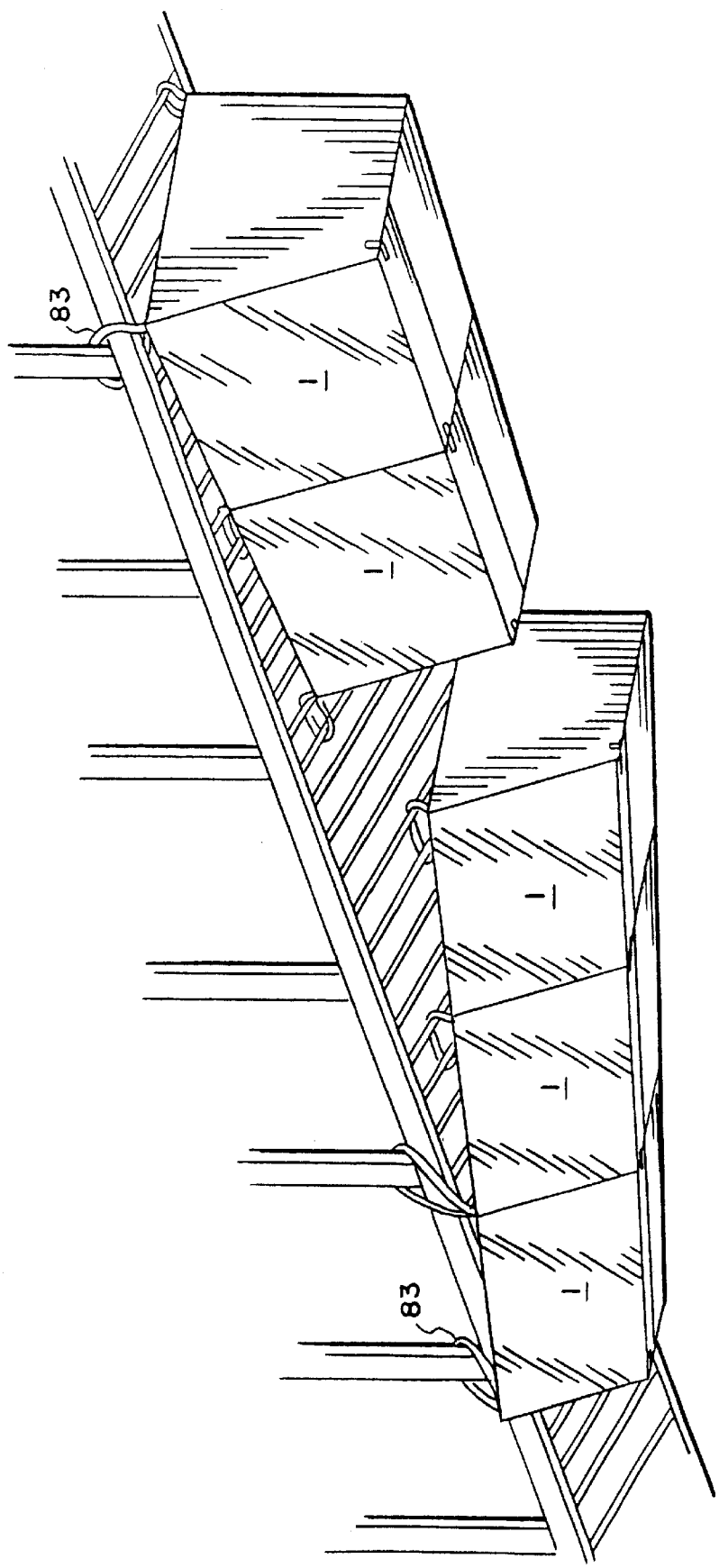
FIG. 1 is a schematic perspective view of five (5) light boxes for front projection illumination of a set in accordance with the invention.

Once the housing, V-brackets and bar are connected, the stage lights are mounted using the C-clamps and the diffusion elements are slid into place. The door 10a is rotated closed and the angle brackets 82 are rotated downward (in FIG. 2) to hold the door closed (as shown in FIG. 1). The box may be disassembled in reverse order.

Preferably, the back of the box is open which allows for venting of the lights, as well as easily mounting them, disconnecting them, electrical line access, and positioning of the lights.

In accordance with another aspect of the invention, several boxes may be used adjacent one another or otherwise positioned to cooperate to light a set. These boxes may be suspended, such as from scaffolding, as shown in FIG. 1. In the television and movie industry, existing scaffolding in indoor stages is known as a green bed. A simple means to suspend the box or boxes from the green bed is to provide eye bolts 81 fixed to the frame members of the top 8 and use chain or rope 83 connected to the eye bolts and the scaffolding as shown in FIG. 1. As also shown in FIG. 1, three boxes 1 are adjacent one another on the viewer's left side of FIG. 1 and two boxes 1 are adjacent one another on the right side of FIG. 1. The three boxes together would typically provide greater light, given use of the same lights in each box, and thus be known as key lighting for a set or stage and the two box group would provide fill light.

Figure 5:
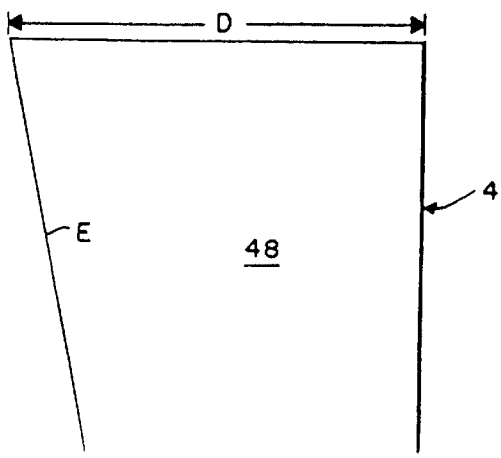
FIG. 5 is a side view of the box according to the invention showing an angle at which the front edges of the left and right side panels are cut in accordance with a further aspect of the invention.

With reference to FIG. 5, the angular front edges of the left and right side members will be explained. The angle provides a way to channel and direct light when the boxes are horizontally mounted, such as shown in FIG. 1, with the top flush or parallel to the green bed or the like. The angle also allows light to project to the upstage portion of the set and the downstage portion, even though the boxes are mounted in the air and close to the set. The angle may be selected depending upon the geometry of where the boxes are mounted in relation to the set, as well as any other factors well known in the art. For example, the top may have a depth dimension D of four feet and the bottom may have a depth dimension C of three feet, thus providing front edge E with an angle "tilted downward." Preferably, the distance from the top of the box to the bottom would also be four feet. The angular orientation of diffusion element 16 also provides a greater surface area with which to diffuse the light.

The boxes can be constructed larger, or smaller, with any appropriately desired dimension, but it is advantageous to construct them with a four-foot square length and width cross-section. This size readily accommodates four lights, the two lights on top and the two lights on the bottom. Alternatively, the box could be eight feet wide by four feet tall which would accommodate eight lights for standard pars. More lights can be fit into a box than is shown in the drawings, to increase the strength depending on the use. In addition, one may put lights at three or more relative heights or put more than two across.

By use of higher powered lights on top, upstage lighting can be comparable to downstage lighting, and by use of boxes placed side to side, lighting at one side of the set can be comparable to lighting at the other side.

Figure 6:
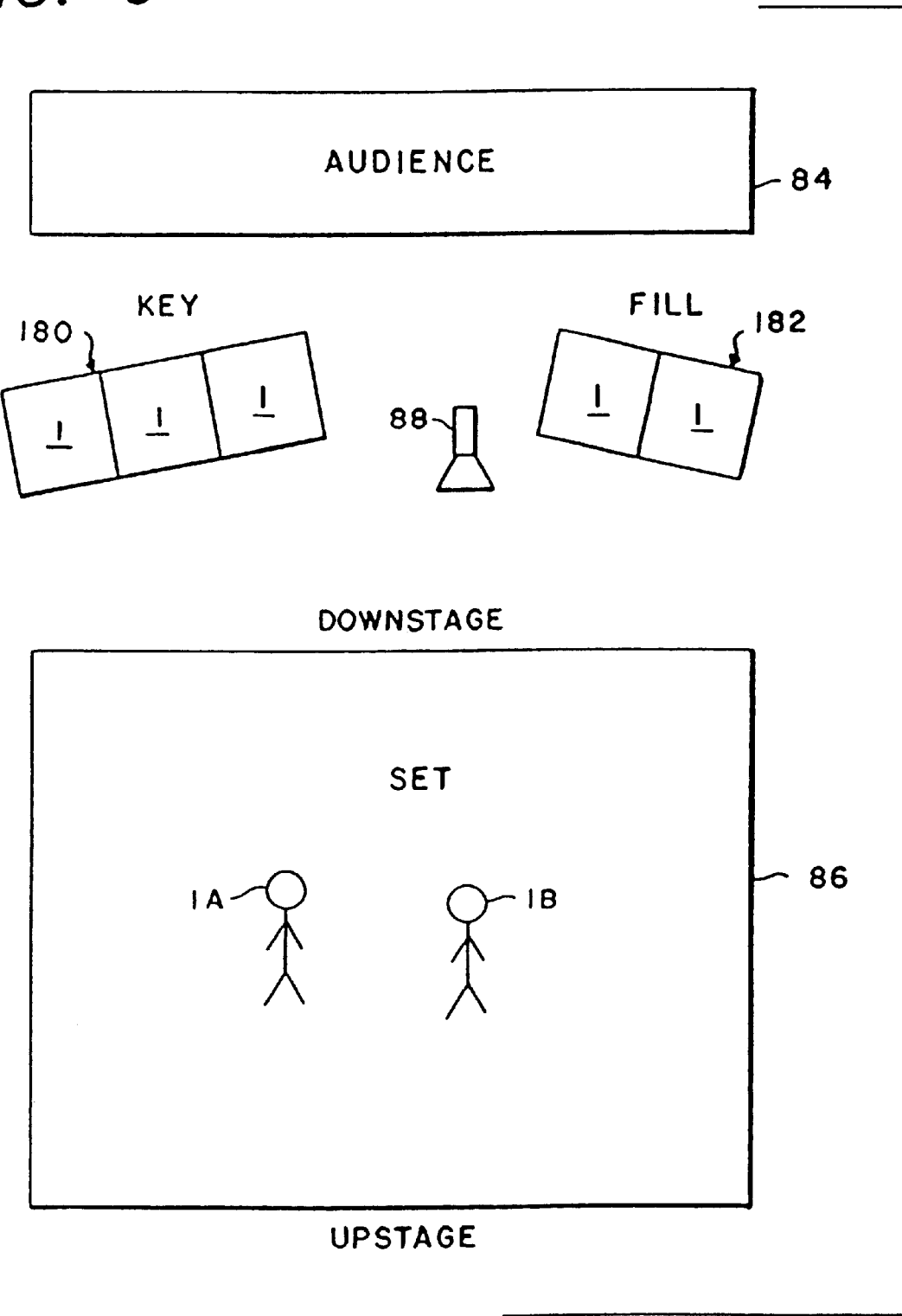
FIG. 6 is a schematic diagram of a set with front projected lighting provided from a plurality of boxes in accordance with the invention.

The diagram of FIG. 6 shows how boxes according to the invention are used to provide for front-projected light to a set. In a sitcom-type set, it has been conventional to light the actors 1A and 1B from the back typically by expensive, high-powered fresnel lights. The back (upstage) of the set 86 is defined with respect to the location of the camera 88 which is at the front (downstage). When a sitcom or the like is filmed, typically there is also an audience 84 located downstage. The key lights 180 and fill lights 182, when constructed in accordance with the invention, may be provided at the front of the set. Undesirable shadows from objects, actors and boom sound equipment, which normally extends from the front from above the green bed, are avoided because of the diffused light emanating from the boxes rather than multiple high-powered beams from multiple lights located below and parallel to the booms. Moreover, the boxes take a diffusion element and apply it to multiple lights in a way that is quickly and easily controlled to light the entire set evenly. When the lights on top of the bar are higher powered than the lights below the bar, the upper lights illuminate the back of the set as well as the lower lights illuminate the front. The system thus may use inexpensive stage lights, e.g., pars, rather than expensive lights, e.g., fresnels, provide a higher level of light with significantly fewer lighting instruments, and achieve greater depth of field. For example, in a three box key light, one may use six 1000-watt pars (medium) for the upper lights and six 1000-watt pars (wide) for the lower lights and achieve a 4.6 @250 ASA on the downstage portion of the set and a 4.3 upstage, allowing for use of slower film or a deeper depth of field, or a combination thereof.

The boxes, when used modularly or collectively, achieve a very desirable lighting effect, and thus it is preferable to form them such that they can be placed side to side, e.g., by using sides 4, 6.

Although the boxes are constructed primarily of aluminum, they may be constructed of any other reasonable material including wood, plastic, foamcore, or fabric on a frame, and may even be disposable. The boxes are, as shown in the preferred embodiment, preferably readily enabled to be disassembled and folded, although other embodiments where the boxes are not readily disassembled can be envisioned. In addition, for example, the bar 14 need not be mounted to V-bracket members, and may instead be directly or more directly mounted to the housing of the box. The box or boxes need not be mounted to green bed, and may be hung from or mounted on pipe, or otherwise mounted, hung or used.

While the present invention has been described with regards to particular embodiments, it is recognized that additional variations of the present invention may be devised without departing from the inventive concept.

What is claimed is:

1. A lighting projection device for controlling and directing light from multiple lights, the lighting projection device comprising:
   (i) a housing having a front;
   (ii) a light mounting element connected to the housing;
   (iii) a plurality of par lamps connected to the light mounting element, wherein the par lamps may be directed toward the front of the housing for illuminating a desired area; and
   (iv) a diffusion mounting element connected to the housing for supporting at least one diffusion element proximate the front of the housing, whereby such a diffusion element would provide light diffusion for the multiple par lamps directed toward the front of the housing for converting light from the par lamps to a soft diffused projected light.

2. The lighting projection device of claim 1 further comprising a diffusion element supported by the diffusion mounting element for diffusing light from the multiple par lamps.

3. The lighting projection device of claim 1 further comprising means in the housing for providing access to the light diffusion element for removing and replacing the light diffusion element.

4. The lighting projection device of claim 1 wherein the housing is foldable.

5. The lighting projection device of claim 1, wherein the light mounting element comprises a rod.

6. The lighting projection device of claim 1 wherein the housing is a semi-rigid material.

7. The lighting projection device of claim 1 further comprising an attachment connected to the housing for mounting the lighting device in a desired position relative to the area to be illuminated.

8. The lighting projection device of claim 1 wherein the housing comprises a fabric.

9. The front projection light device of claim 11 further comprising a secondary filter holding element disposed in said housing spaced from the first filter holding element.

10. The front projection light device of claim 11 wherein the sides of the housing comprise an aluminum material.

11. A front projection light device comprising:
    a housing capable of supporting a plurality of par lamps;
    wherein said housing has a plurality of sides and a front;

a primary filter holding element disposed in said housing proximate the front;

wherein said sides are adjacent one another and extend at least to said primary filter holding element;

a light mounting element for supporting said plurality of par lamps therefrom, such that said par lamps are directed toward said front;

wherein said housing is enclosed at least between the light mounting element and said primary filter holding element; and wherein said primary filter holding element is supported from said housing proximate said front, whereby when a filter element is mounted in said primary filter holding element, light produced by said par lamps is directed therethrough.

12. The front projection light device of claim 11, further comprising means for providing access through said housing to said primary holding element for removing and replacing said primary holding element.

13. The front projection light device of claim 11, further comprising means attached to said housing for suspending the front projection light device.

14. The front projection light device of claim 11, wherein said housing comprises a plurality of sides each comprising an aluminum material.

15. The front projection light device of claim 11, further comprising a primary filter element disposed in said primary filter holding element.

16. The front projection light device of claim 15, wherein said primary filter element is a material that diffuses said light from said pars.

17. The front projection light device of claim 11, further comprising a secondary filter holding element, wherein said secondary holding element is supported from said housing spaced from said primary filter holding element such that, when filter elements are mounted in said primary holding element and said secondary holding element, light produced by said plurality of pars is directed therethrough.

18. The front projection light device of claim 17, wherein a primary filter element is disposed in said primary filter holding element and a secondary filter element is disposed in said secondary filter holding element.

19. The front projection light device of claim 18, wherein said secondary filter element is a material that diffuses said light from said pars.

20. A light projection device for controlling and directing light from multiple par lights, the light projection device comprising:

a housing;

multiple par lamps;

a light mounting element connected to the housing supporting the multiple par lamps directed toward a front of the housing;

a diffusion mounting element connected to the housing supporting at least one diffusion element proximate the front of the housing, whereby the diffusion element will provide light diffusion for multiple par lamps directed thereat; and wherein said housing is enclosed at least between the light mounting element and diffusion mounting element, and there are means on the housing for providing access to the diffusion mounting element for removal and replacement thereof.

\* \* \* \* \*

(12) EX PARTE REEXAMINATION CERTIFICATE (5421st)
United States Patent
Finn et al.

(10) Number: US 6,588,912 C1
(45) Certificate Issued: *Jun. 20, 2006

(54) FOLDABLE MODULAR LIGHT DIFFUSION BOX

(75) Inventors: Bruce L. Finn, 1030 Stanford St., Santa Monica, CA (US) 90403; Robert E. Lee, Topanga, CA (US)

(73) Assignee: Bruce L. Finn, Santa Monica, CA (US)

Reexamination Request:
No. 90/006,864, Nov. 13, 2003

Reexamination Certificate for:
Patent No.: 6,588,912
Issued: Jul. 8, 2003
Appl. No.: 09/642,315
Filed: Aug. 21, 2000

(*) Notice: This patent is subject to a terminal disclaimer.

Related U.S. Application Data

(63) Continuation of application No. 09/146,063, filed on Sep. 2, 1998, now Pat. No. 6,106,125.

(51) Int. Cl.
    *G03B 15/06* (2006.01)

(52) U.S. Cl. .............................. 362/11; 362/17; 362/368
(58) Field of Classification Search ....................... None
    See application file for complete search history.

(56) References Cited

U.S. PATENT DOCUMENTS 3,633,024 A * 1/1972 Hankins ..................... 362/362
4,546,420 A * 10/1985 Wheeler et al. ............ 362/268

FOREIGN PATENT DOCUMENTS

GB 2236869 A * 4/1991

OTHER PUBLICATIONS

"MOLEPAR" in Mole Richardson Lighting advertisement (2d edition) published in 1970.*

CHIMERA product catolgs published on Sep. 1996 and May 1997.*

* cited by examiner

*Primary Examiner*—Thomas M. Sember

(57) ABSTRACT

A lighting box or front projection light device has a housing with an open front and open rear and a bar or rod extending horizontally across the housing. Multiple stage-type nonfocusable lights such as par lamps are mounted on the bar and positioned to send light out the front of the box. The box also has a diffusion element holder (frame) disposed proximate its front end, and even may have multiple diffusion element holders including having one diffusion element holder at an angle. Each diffusion element holder has a diffusion element or filter. The diffusion element or elements receive the light from the lighting instruments and diffuse it to provide a soft projected light from the box. In accordance with one aspect of the invention, this light may be used to provide diffused light as part of the key lighting for a stage or set, and may provide such soft projected lighting from a front (downstage) of the stage or set.

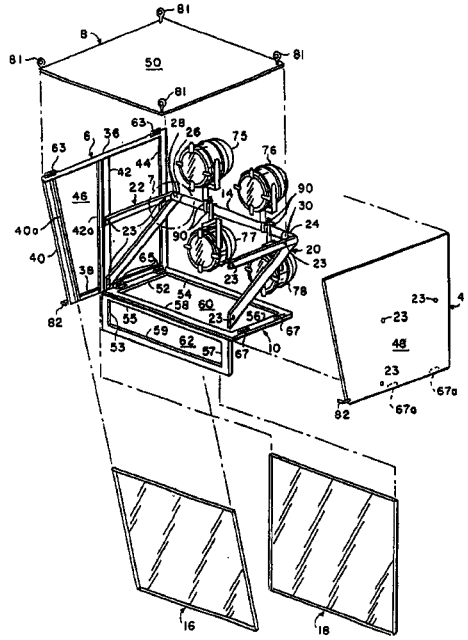

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 and 20 is confirmed.

Claims 11, 15, 17 and 18 are cancelled.

Claims 9-10, 12-14, 16 and 19 are determined to be patentable as amended.

9. The front projection light device of claim [11] *16* further comprising a secondary filter holding element disposed in said housing spaced from the first filter holding element.

10. The front projection light device of claim [11] *16* wherein the sides of the housing comprise an aluminum material.

12. The front projection light device of claim [11] *16*, further comprising means for providing accesss through said housing to said primary holding element for removing and replacing said primary holding element.

13. The front projection light device of claim [11] *16*, further comprising means attached to said housing for suspending the front projection light device.

14. The front projection light device of claim [11] *16*, wherein said housing comprises a plurality of sides each comprising an aluminum material.

16. [The] *A* front projection light device [of claim 15,] *comprising:*
   *a housing capable of supporting a plurality of par lamps;*
   *wherein said housing has a plurality of sides and a front;*
   *a primary filter holding element disposed in said housing proximate the front;*
   *wherein said sides are adjacent one another and extend at least to said primary filter holding element;*
   *a light mounting element for supporting said plurality of par lamps therefrom, such that said par lamps are directed toward said front, wherein said housing is enclosed at least between the light mounting element and said primary filter holding element; and*
   *a primary filter element disposed in said primary filter holding element;*
   *wherein said primary filter holding element is supported from said housing proximate said front, whereby when a filter element is mounted in said primary filter holding element, light produced by said par lamps is directed therethrough; and*
   wherein said primary filter element is a material that diffuses said light from said pars.

19. [The] *A* front projection light device [of claim 18,] *comprising:*
   *a housing capable of supporting a plurality of par lamps;*
   *wherein said housing has a plurality of sides and a front;*
   *a primary filter holding element disposed in said housing proximate the front;*
   *wherein said sides are adjacent one another and extend at least to said primary filter holding element;*
   *a light mounting element for supporting said plurality of par lamps therefrom, such that said par lamps are directed toward said front, wherein said housing is enclosed at least between the light mounting element and said primary filter holding element;*
   *wherein said primary filter holding element is supported from said housing proximate said front, whereby when a filter element is mounted in said primary filter holding element, light produced by said par lamps is directed therethrough; and*
   *a secondary filter holding element, wherein said secondary holding element is supported from said housing spaced from said primary filter holding element such that, when filter elements are mounted in said primary holding element and said secondary holding element, light produced by said plurality of pars is directed therethrough;*
   *wherein a primary filter element is disposed in said primary filter holding element and a secondary filter element is disposed in said secondary filter holding element; and*
   wherein said secondary filter element is a material that diffuses said light from said pars.

\* \* \* \* \*